US007820901B2

(12) United States Patent
Terauchi et al.

(10) Patent No.: US 7,820,901 B2
(45) Date of Patent: Oct. 26, 2010

(54) INFORMATION MANAGEMENT METHOD, INFORMATION MANAGEMENT PROGRAM, AND INFORMATION MANAGEMENT DEVICE

(75) Inventors: Toshiro Terauchi, Tokyo (JP); Yoichiro Sako, Tokyo (JP); Masayoshi Miura, Chiba (JP); Makoto Inoue, Tokyo (JP); Kosei Yamashita, Kanagawa (JP); Yasushi Miyajima, Kanagawa (JP); Motoyuki Takai, Tokyo (JP); Shigeharu Kondo, Kanagawa (JP); Takayuki Miyama, Tokyo (JP); Norihiro Nagai, Kanagawa (JP); Kosuke Suzuki, Kanagawa (JP); Kentaro Hatanaka, Tokyo (JP); Yumiko Homma, Tokyo (JP); Ryo Takaoka, Tokyo (JP)

(73) Assignee: Sony Corporation, Tokyo (JP)

( * ) Notice: Subject to any disclaimer, the term of this patent is extended or adjusted under 35 U.S.C. 154(b) by 15 days.

(21) Appl. No.: 11/718,338

(22) PCT Filed: Oct. 26, 2005

(86) PCT No.: PCT/JP2005/020054

§ 371 (c)(1),
(2), (4) Date: May 1, 2007

(87) PCT Pub. No.: WO2006/049141

PCT Pub. Date: May 11, 2006

(65) Prior Publication Data

US 2007/0294301 A1 Dec. 20, 2007

(30) Foreign Application Priority Data

Nov. 1, 2004 (JP) .............................. 2004-317843

(51) Int. Cl.
*G10H 1/00* (2006.01)

(52) U.S. Cl. .............................. 84/600; 84/609; 386/95; 704/270; 707/104.1

(58) Field of Classification Search .................. 84/600, 84/609; 386/95; 704/270; 707/104.1
See application file for complete search history.

(56) References Cited

U.S. PATENT DOCUMENTS

| 5,679,911 | A  | * | 10/1997 | Moriyama et al. ............ 84/601 |
| 6,269,238 | B1 | * | 7/2001  | Iggulden ..................... 434/317 |
| 6,744,971 | B1 | * | 6/2004  | Noguchi ....................... 386/95 |
| 7,145,068 | B2 | * | 12/2006 | Mizuno ..................... 84/477 R |

(Continued)

FOREIGN PATENT DOCUMENTS

JP 2-121058 5/1990

(Continued)

*Primary Examiner*—Bentsu Ro
*Assistant Examiner*—Kawing Chan
(74) *Attorney, Agent, or Firm*—Oblon, Spivak, McClelland, Maier & Neustadt, L.L.P.

(57) ABSTRACT

A file storage apparatus provides an information management method. The information management method includes correlating one or more electronic files with audible cues relative to audio content reproduced via the file storage apparatus, designating respective time intervals of the audio content during which each of the one or more electronic files can be accessed by the file storage apparatus, and retrieving the one or more electronic files of the file storage apparatus upon a predetermined user input provided to the file storage apparatus during one of the respective time intervals of the audio content.

7 Claims, 12 Drawing Sheets

U.S. PATENT DOCUMENTS

| | | | |
|---|---|---|---|
| 7,149,755 B2 | 12/2006 | Obrador | |
| 2002/0018525 A1* | 2/2002 | Nishi et al. | 375/240.27 |
| 2002/0025842 A1* | 2/2002 | Nobe et al. | 463/7 |
| 2002/0033889 A1* | 3/2002 | Miyazaki | 348/232 |
| 2002/0184189 A1* | 12/2002 | Hay et al. | 707/1 |
| 2003/0009344 A1* | 1/2003 | Kayama et al. | 704/500 |
| 2003/0019347 A1* | 1/2003 | Weiner et al. | 84/609 |
| 2003/0192058 A1* | 10/2003 | Miyatake et al. | 725/115 |
| 2003/0234772 A1* | 12/2003 | Zhang et al. | 345/177 |
| 2003/0236843 A1* | 12/2003 | Weber et al. | 709/206 |
| 2004/0055445 A1* | 3/2004 | Iyoku et al. | 84/609 |
| 2004/0109677 A1* | 6/2004 | Seo et al. | 386/95 |
| 2004/0136695 A1* | 7/2004 | Kuroiwa | 386/96 |
| 2004/0153970 A1* | 8/2004 | Shinoda et al. | 715/517 |
| 2004/0163527 A1* | 8/2004 | Kawai et al. | 84/603 |
| 2004/0189827 A1* | 9/2004 | Kim et al. | 348/231.4 |
| 2004/0240851 A1* | 12/2004 | Togita | 386/95 |
| 2004/0240855 A1* | 12/2004 | Kagle | 386/96 |
| 2005/0091574 A1* | 4/2005 | Maaniitty et al. | 715/500.1 |
| 2005/0105888 A1* | 5/2005 | Hamada et al. | 386/95 |
| 2005/0196155 A1* | 9/2005 | Yoo et al. | 386/126 |
| 2005/0249375 A1* | 11/2005 | Seo et al. | 382/100 |
| 2005/0259172 A1* | 11/2005 | Okawa | 348/333.12 |
| 2006/0083128 A1* | 4/2006 | Suzuki | 369/47.1 |

FOREIGN PATENT DOCUMENTS

| | | |
|---|---|---|
| JP | 6-231179 | 8/1994 |
| JP | 9 101928 | 4/1997 |
| JP | 9-130721 | 5/1997 |
| JP | 11-65901 | 3/1999 |
| JP | 11-136606 | 5/1999 |
| JP | 2002 288015 | 10/2002 |
| JP | 2002-311986 | 10/2002 |
| JP | 2003 116095 | 4/2003 |
| JP | 2003-274352 | 9/2003 |
| JP | 2004 134983 | 4/2004 |
| JP | 2005-535018 | 11/2005 |
| WO | 2004 012105 | 2/2004 |

* cited by examiner

| MUSIC FILE NAME | MUSIC PLAYING POSITION (TIME m:s:n) | CORRELATED INFORMATION |
|---|---|---|
| c:¥MUSIC¥ABCD.WAV | 01:21:00 | c:¥DATA¥FILE.TXT |
| c:¥MUSIC¥ABCD.WAV | 01:26:21 | c:¥Program Files¥PRG01.EXE |
| c:¥MUSIC¥ABCD.WAV | 02:01:05 | URL::http://www.jpo.go.jp/ |
| c:¥MUSIC¥ABCD.WAV | 03:05:30 | memo::c:¥memo¥0001.TXT |
| c:¥MUSIC¥1234.MP3 | 00:20:20 | TV::XXch[12h00m00s] |
| http://www.○○○.○○/music/music.mp3 | 00:28:01 | c:¥DATA¥FILE01.TXT |
| c:¥MUSIC¥EFG.MID | 00:30:01 | c:¥MOVIE¥001.MOV |
| .. | .. | .. |

INFORMATION MANAGEMENT METHOD, INFORMATION MANAGEMENT PROGRAM, AND INFORMATION MANAGEMENT DEVICE

TECHNICAL FIELD

The present invention relates to an information management method, an information management program, and an information management apparatus that allow desired information to be easily registered and retrieved.

BACKGROUND ART

In recent years, as the capacities of record mediums such as hard disks have been increased, computer devices such as personal computers have been able to manage large numbers of files.

As the number of files that can be managed increases, it is becoming important to quickly retrieve a desired file from such a large number of files. As a general file retrieval method, a desired file is retrieved from a list of files that are arranged for example in the order of file names, file creation dates, file sizes, file types, and so forth. As an another file retrieval method, files are iconized using a GUI (Graphical User Interface). In this case, when a file is a picture file, its image is iconized.

Patent Document 1, Japanese Patent Application Laid-Open No. 2002-288015, discloses a technique of which a file is retrieved on the basis of a user's conceptual memory corresponding to attribute information that the user has designated when he or she has created the file.

Various types of information such as text data, picture data, moving picture data, audio data, and program data are stored in a record medium. In the past, when these information was stored in a record medium, it was categorized and registered for example on the basis of file names, titles assigned to data contents, and/or additional information about data. Thus, when stored information was retrieved, it was necessary to input a file name and/or a title with input means such as a keyboard. Thus, such an operation was very bothersome.

In addition, when a file name or the like did not represent contents of the file, it was very difficult to retrieve the file.

In addition, when picture data or audio data were retrieved, it was necessary to directly browse picture data or listen to audio data. In particular, when a large amount of data was stored, it was very bothersome to retrieve desired data.

In addition, in many past retrieval methods, desired information was retrieved based on a list. Thus, information retrieval was relied on the sense of sight. When information retrieval from a large amount of information is relied on the sense of sight, since information is not displayed in one page, it is necessary to perform a bothersome operation such as scroll the screen, resulting in making user's eyes tired.

DISCLOSURE OF THE INVENTION

Therefore, an object of the present invention is to provide an information management method, an information management program, and information management apparatus that allow desired information to be easily retrieved from various types of information.

To solve the foregoing problem, the present invention is an information management method of correlating information with time information of content data that change in time series.

In addition, the present invention is an information management program which causes a computer device to execute an information management method of correlating information with time information of content data which change in time series.

In addition, the present invention is an information management apparatus which correlates information with time information of content data which change in time series.

As described above, according to the present invention, since information is correlated with time information of content data that change in time series, the information can be intuitionally registered and retrieved based on reproduction of the content data. Thus, it is not necessary to perform a bothersome text input. In addition, information can be retrieved without necessity of using a keyword or the like. In addition, it is not necessary to stare the screen when information is registered and retrieved.

According to the present invention, since information is correlated with time information of content data that change in time series, the information can be easily and intuitionally registered and retrieved from registered information as an effect of the present invention.

When content data are for example music data, information is retrieved based on for example a melody of music, which has a very strong image inducing force. Thus, information can be intuitionally retrieved without necessity of using specific text information such as a keyword.

When content data are music data, since information is retrieved based on a sound, it is not necessary to stare a monitor screen, resulting in making user's eyes not tired as an effect of the present invention. In addition, even if the user is visually impaired, he or she can easily retrieve information as an effect of the present invention. In addition, when music used to retrieve information is played at high speed, desired information can be quickly retrieved. Thus, according to the present invention, the workload that the user performs is lower than that in the method of which information is retrieved by scrolling a list of information displayed on the monitor screen as an effect of the present invention.

When content data are music data, information can be registered with music suitable for each user without visual influence of performance, quality, screen size, and so forth of the monitor device. Thus, information can be managed and retrieved based on a user's view point.

BRIEF DESCRIPTION OF DRAWINGS

FIG. 8 is a schematic diagram showing an example of a registration table that correlates information registration music data, their music playing positions, and information;

BEST MODES FOR CARRYING OUT THE INVENTION

Next, an embodiment of the present invention will be described. According to the present invention, information is managed by correlating it with time information of content data that change in time series. When information is retrieved, for example content data are reproduced. When the reproduction position of the content data has come to a position at which information has been correlated, a predetermined instruction is issued. As a result, information correlated with the position is accessed. In this example, content means what a person artificially created or produced to express for others by intentionally arranging any types of information.

First of all, a first embodiment of the present invention will be described. In the first embodiment of the present invention, content data are music data and information is managed by correlating it with music playing positions. When information is retrieved, music is played. When the music playing position of the music data has come to a position at which information has been correlated, a predetermined instruction is issued. In this manner, information correlated with such a position is accessed.

Since music generally has a repetitive structure or a predetermined pattern, it is easy to identify and predict a music playing position. In addition, since music is created to appeal to a person's emotion, it has a strong image inducing force. Thus, the user can unintentionally memorize essentials of music. Thus, when information is correlated with music playing positions, it can be intuitively registered and retrieved without necessity of performing a bothersome input operation. When information is retrieved, it is not necessary to remind a key word corresponding to the information.

In the following description, it is assumed that music includes a sound that is intentionally arranged and obtained by a person, not limited to general music. Music playing means that music that has been reproducibly recorded is reproduced and thereby a sound is output. In the first embodiment, music has been recorded as digital data (referred to as music data). The digital data are played such that they are reproduced as a sound and output by a computer device.

Figure 1:
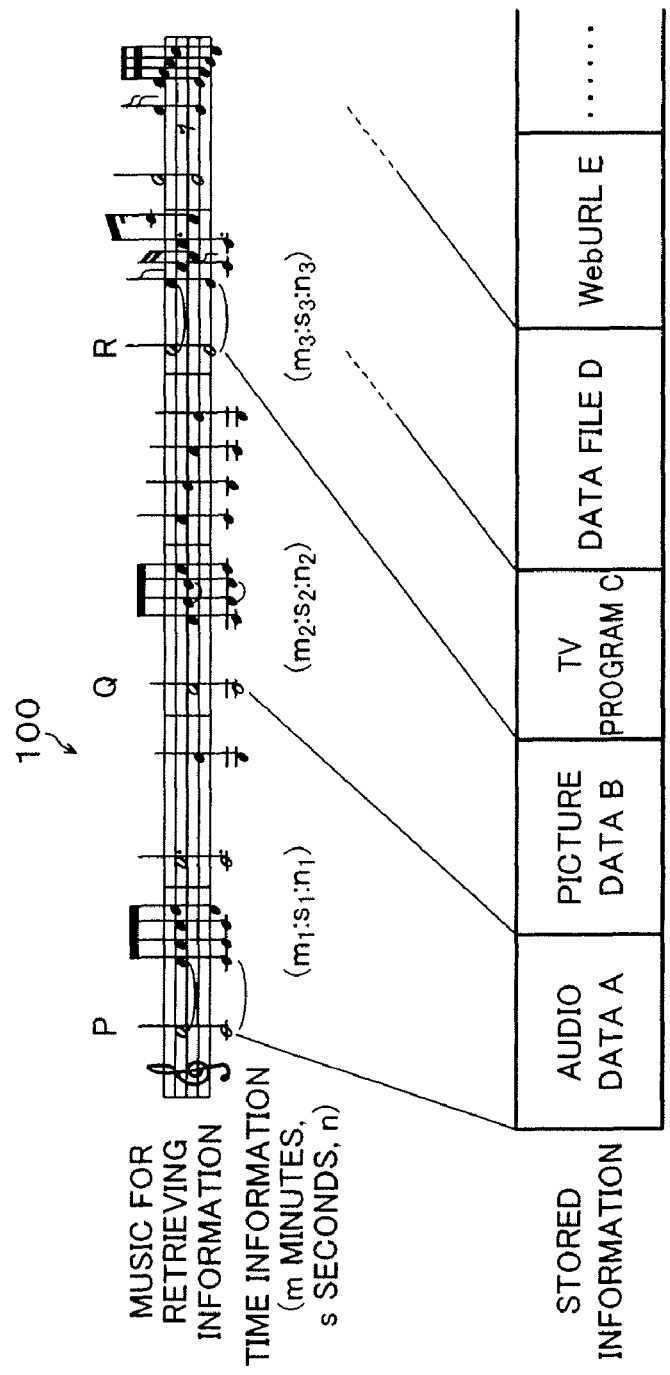
FIG. 1A and FIG. 1B are schematic diagrams conceptually describing an information management method according to a first embodiment of the present invention.

Next, with reference to FIG. 1A and FIG. 1B, an information management method according to the first embodiment of the present invention will be conceptually described. FIG. 1A shows an example of music as a musical score played by for example a computer device. The user causes for example the computer device to play music (song 100) as shown in FIG. 1A. The user selects his or her desired information. While the user is listening to music using an acoustic device such as a speaker or a headphone, he or she operates input means such as a keyboard at a music playing position where he or she wants to register information. Corresponding to this operation, the computer device correlates information that he or she had selected with the music playing position of the song 100 corresponding to the user's operation, resulting in registering the information to the song 100. The playing position is represented for example by a playing time (m minutes, s seconds, n) from the beginning of the song 100.

In the example shown in FIG. 1A and FIG. 1B, audio data A are correlated with music playing position P of the song 100. Picture data B are correlated with music playing position Q. Television program C is correlated with music playing position R. Television program C is composed of information of a broadcasting channel, a broadcasting time, and so forth. In addition, data file D and URL (Uniform Resource Locator) (not shown), which represents the location of information on the Internet, are also correlated with other music playing positions of the song 100. Thus, in the first embodiment of the present invention, besides files and folders, various types of information can be managed by correlating them with music.

Next, an example of a method of retrieving information according to the present invention will be conceptually described. In this example, picture data B are retrieved. The user causes the computer device to play the song 100. While the user is listening to the played music with an acoustic device such as a speaker or a headphone, when the computer device plays for example a melody that was played when picture data B were registered, he or she operates predetermined input means such as a keyboard. In the example shown in FIG. 1A and FIG. 1B, the melody is played at music playing position Q. When the user has listened to the played melody, he or she operates the input means in a predetermined manner. Corresponding to this operation, picture data B correlated with music playing position Q are accessed.

Since information is retrieved based on for example a melody of a song that has a strong image inducing force, the user can intuitively retrieve information without necessity of using specific text information such as a keyword. In addition, since the user retrieves information with a sound, he or she does not need to stare a monitor screen, resulting in making his or her eyes not tired. Even if the user is visually impaired, he or she can easily retrieve information. When music used to retrieve information is played at high speed, desired information can be quickly retrieved. Thus, the workload that the user performs is lower than that in the method of which information is retrieved by scrolling a list of information displayed on the monitor screen.

Information can be registered with music suitable for each user without visual influence of performance, quality, screen size, and so forth of the monitor device. Thus, information can be managed and retrieved based on a user's view point.

In the foregoing example, it is assumed that points at which information is retrieved are only music playing positions designated when the information was registered. However, the present invention is not limited to such an example. In other words, the user may not be able to accurately designate a music playing position at which information was registered. Thus, information may be able to be retrieved in a predetermined range including a playing position at which information was registered. For example, first information may be retrieved after a music playing position at which the first information was registered before a music playing position of the same music at which second information preceded by the first information was registered.

In the example shown in FIG. 1A and FIG. 1B, audio data A can be retrieved in the range after music playing position P immediately before music playing position Q. When a predetermined operation is performed with input means after music playing position P before music playing position Q, music data A is retrieved.

A retrievable range may be designated in other than such an example. For example, a predetermined duration after a music playing position at which information was registered may be designated as a retrievable range. In this duration, it is preferred that another information be prohibited from being registered. When a tempo or the like of music is known, a retrievable range may be designated as the number of beats including a registered music playing position. In the foregoing example, it was assumed that a retrieval range is preceded by a registered music playing position. Instead, a predetermined range before and after a registered music playing position may be designated as a retrievable range.

Figure 2:
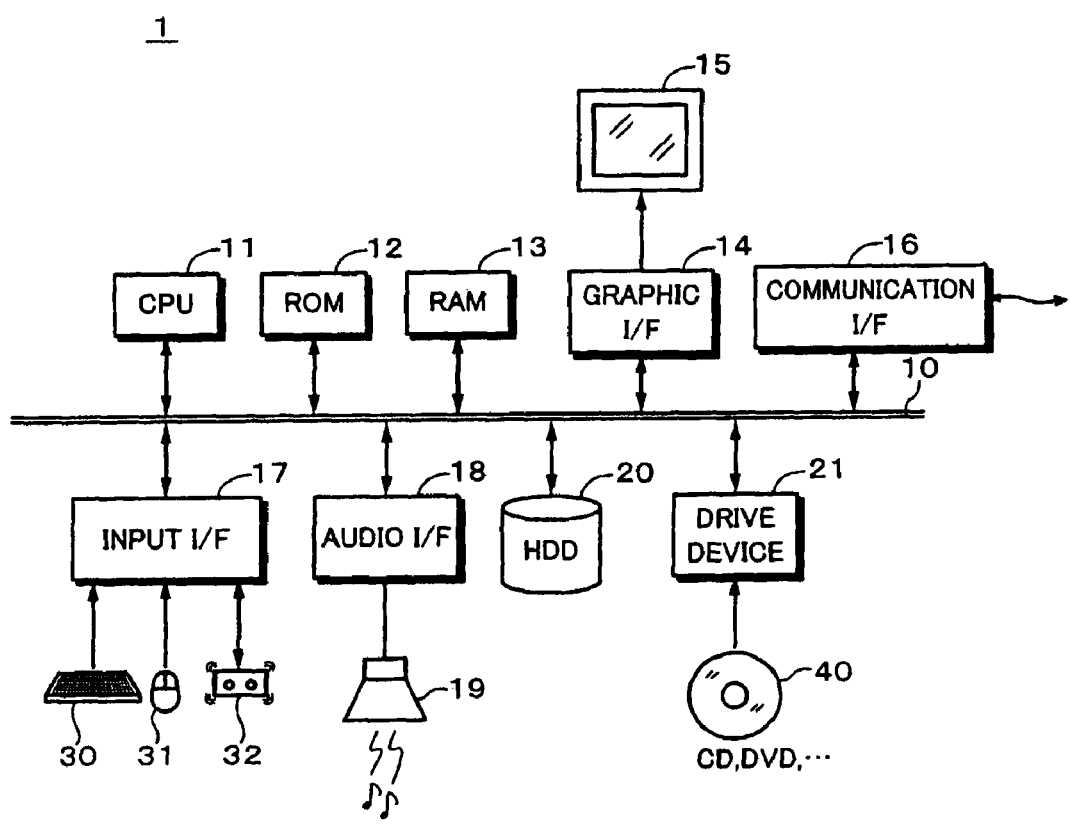
FIG. 2 is a block diagram schematically showing the structure of an example of a computer device according to the first embodiment of the present invention.

FIG. 2 shows an outline of the structure of a computer device 1 according to the first embodiment of the present invention. In the computer device 1, a CPU (Central Processing Unit) 11, a ROM (Read Only Memory) 12, and a RAM (Random Access Memory) 13 are connected to a bus 10. The CPU 11 uses the RAM 13 as a work memory, communicates with each section of the computer device 1 through the bus 10, and controls each section of the computer device 1 corresponding to a program and data stored in the ROM 12 or a hard disk drive 20, which will be described later.

Connected to the bus 10 are also a graphic interface (I/F) 14 and a communication interface (I/F) 16. Connected to the graphic I/F 14 is a monitor 15. The graphic I/F 14 converts a display control signal supplied from the CPU 11 into a picture signal, supplies the picture signal to the monitor 15, and causes the monitor 15 to display a predetermined picture. On the other hand, connected to the communication I/F 16 is a network for example the Internet. The communication I/F 16 controls communications between the computer device 1 and the outside through the network based on commands issued from the CPU 11.

Connected to the bus 10 are also an input interface (I/F) 17, an audio interface (I/F) 18, a hard disk drive 20, and a drive device 21.

Connected to the input I/F 17 are input devices that accept user's inputs, for example a keyboard 30, a mouse 31, and a control pad 32. The keyboard 30 outputs a control signal corresponding to a key that the user has pressed. The mouse 31 is a pointing device that outputs position information composed of X and Y coordinates and a control signal corresponding to a button that the user has pressed. The mouse 31 may be provided with another operation device such as a rotary encoder. It can be thought that another example of pointing devices is a tablet.

The control pad 32 is provided with a cross-key that outputs control signals corresponding to up, down, left, and right positions or a joy stick that outputs X and Y coordinates, and an operation device such as a switch that the user presses. The input I/F 17 converts control signals and coordinates that are input from these input devices into predetermined data and supplies the converted data to the CPU 11 through the bus 10. For example, the control pad 32 may be provided with a vibration function. With the vibration function, the control pad 32 is vibrated corresponding to a command supplied from the CPU 11 to the control pad 32 through the input I/F 17.

Input devices that can be connected to the input I/F 17 are not limited to these devices. For example, a jog dial (rotary encoder) that can continuously vary an output value may be connected to the input I/F 17.

The audio I/F 18 converts digital audio data supplied through the bus 10 into an analog audio signal, and outputs the analog audio signal. The analog audio signal that is output from the audio I/F 18 is amplified by an amplifier (not shown) and reproduced as a sound for example by a speaker 19 or a headphone (not shown).

The hard disk drive 20 stores programs, such as an OS (Operating System) and application software, and data. In addition, the hard disk drive 20 stores various types of user's data that the user has collected. The user's data include any types of data that the OS can manage, for example music data, picture data, and text data. In addition, music data used to register information according to the present invention can be stored in the hard disk drive 20.

The drive device 21 can reproduce data from a CD (Compact Disc) and a DVD (Digital Versatile Disc). Instead, the drive device 21 may write data to a disc according to CD and DVD writable standards. Instead, the drive device 21 may correspond to an FD (Flexible Disc) and an MO (Magneto-Optical) disc. Instead, the drive device 21 may correspond to a nonvolatile memory such as a flash memory.

Figure 3:
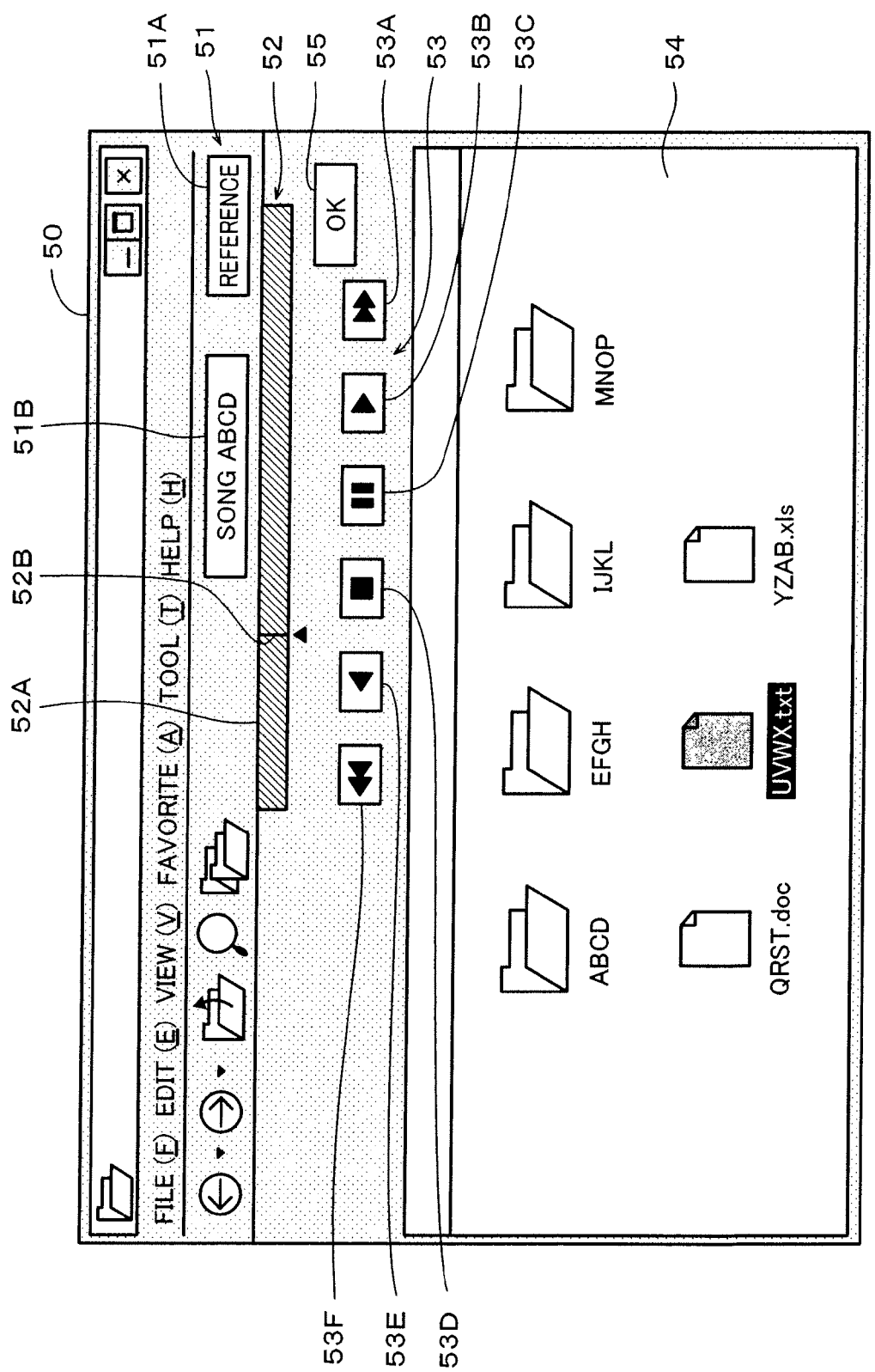
FIG. 3 is a schematic diagram showing an example of a user interface with which information is registered according to the first embodiment of the present invention.

FIG. 3 shows an example of a user interface with which information is registered according to the first embodiment of the present invention. Various types of user interfaces, procedures, registration tables, and so forth that follow are examples of the present invention. Thus, the present invention is not limited to these examples.

In the example shown in FIG. 3, a registration screen 50 is composed of a GUI (Graphic User Interface). The registration screen 50 is displayed on the monitor 15 corresponding to a display control signal generated by the CPU 11 based on programs and data stored for example in the hard disk drive 20. When a predetermined position represented by for example a button image or a predetermined item image is designated by a pointing device for example a button on the registration screen 50 and a predetermined operation is performed for the pointing device in a predetermined manner, for example a button is pressed, the CPU is caused to execute a function assigned to the position.

In the following, since the click operation, the selection operation, and the drag and drop operations of the pointing device for icons and so forth displayed on the GUI are well known, for simplicity, their detail description will be omitted. A sequence of operations of moving a cursor to a button image or an item image displayed on the GUI and clicking a button or the like of the pointing device is simply referred to as "clicking a button image".

In FIG. 3, the registration screen 50 contains a music selection portion 51, a music playing position display portion 52, a music playing control portion 53, a data display portion 54, and an OK button 55.

The music selection portion 51 is used to select music data used to register information. For example, by clicking a reference button 51A of the music selection portion 51, music data stored in the hard disk drive 20 are listed and music data that are used to register information are selected. A file name of the selected music data is displayed in a display portion 51*b* of the music selection portion 51. When music data contain for example song name information and so forth as attribute information, the song name information may be displayed in the display portion 51*b*. Information is registered at a music playing position of music data displayed in the display portion 51*b*. Hereinafter, music data used to register this information is referred to as information registration music data.

The information registration music data are not limited to a particular format as long as they can be played by the computer device 1 and music playing positions can be identified. For example, as the information registration music data, non-compressed audio data that have been generated according to PCM (Pulse Code Modulation) can be used. Instead, the information registration music data may be audio data that have been compression-encoded according to a predetermined system such as MP3 (Moving Pictures Experts Group 1 Audio Layer 3), AAC (Advanced Audio Coding), or ATRAC (Adaptive Transform Acoustic Coding). Besides audio data, performance instruction data that instructs music playing such as MIDI (Musical Instrument Digital Interface) can be used as the information registration music data.

A display portion 52A of the music playing position display portion 52 displays the full length of music data displayed in the display portion 51B of the music selection portion 51. A position line 52B represents a current music playing position. When the position line 52B is dragged, the music playing position can be changed.

The music playing control portion 53 contains buttons 53A to 53B with which playing of music data displayed in the display portion 51B is controlled. The button 53A is a fast-forward button with which music data are played at high speed. The button 53B is a reproduction button with which music data are played at normal speed in forward direction. The button 54C is a stop button with which playing of music data is stopped and the current music playing position is returned to the beginning. The button 54D is a pause button with which playing is temporarily stopped without moving the current music playing position. After the pause button 54D is clicked, when the pause button 54D is clicked again or the reproduction button 53B is clicked, playing of music data is resumed from the temporally stopped music playing position. The button 54E is a reverse reproduction button with which music data are played at normal speed in reverse direction. The button 54F is a fast-reverse button with which music data are played at high speed in reverse direction.

Buttons contained in the music playing control portion 53 are not limited to such an example. A control that changes playing speed of music data and plays music data at desired speed can be provided. When a jog dial is connected to the input I/F 17 and the playing speed is designated as a rotation angle of the jig dial, playing speed of music data can be varied. With the jog dial, playing speed of music data can be easily changed.

Information displayed in the data display portion 54 can be registered to information registration music data displayed in the display portion 51B of the music selection portion 51. For example, an icon of a file or an icon of a folder can be dragged, dropped, and displayed in the data display portion 54. Instead, the data display portion 54 can be used as a reference screen on which files and folders that the computer device 1 can access are referenced. In this case, for example files and folders stored in the hard disk drive 20, files and folders that are stored in another computer connected through the communication I/F 16, and files and folders that the computer device 1 is permitted to browse, and files and folders recorded on a record medium that is currently loaded into the drive device 21 can be displayed in the data display portion 54.

The OK button 55 is a button with which information is correlated with a music playing position of information registration music data and information is registered to music data. When the OK button 55 is clicked while information registration music data are being played, the information registration music data, music playing position data corresponding to the click position of the OK button 55, and selected information are correlated based on a registration table (which will be described later).

Figure 4:
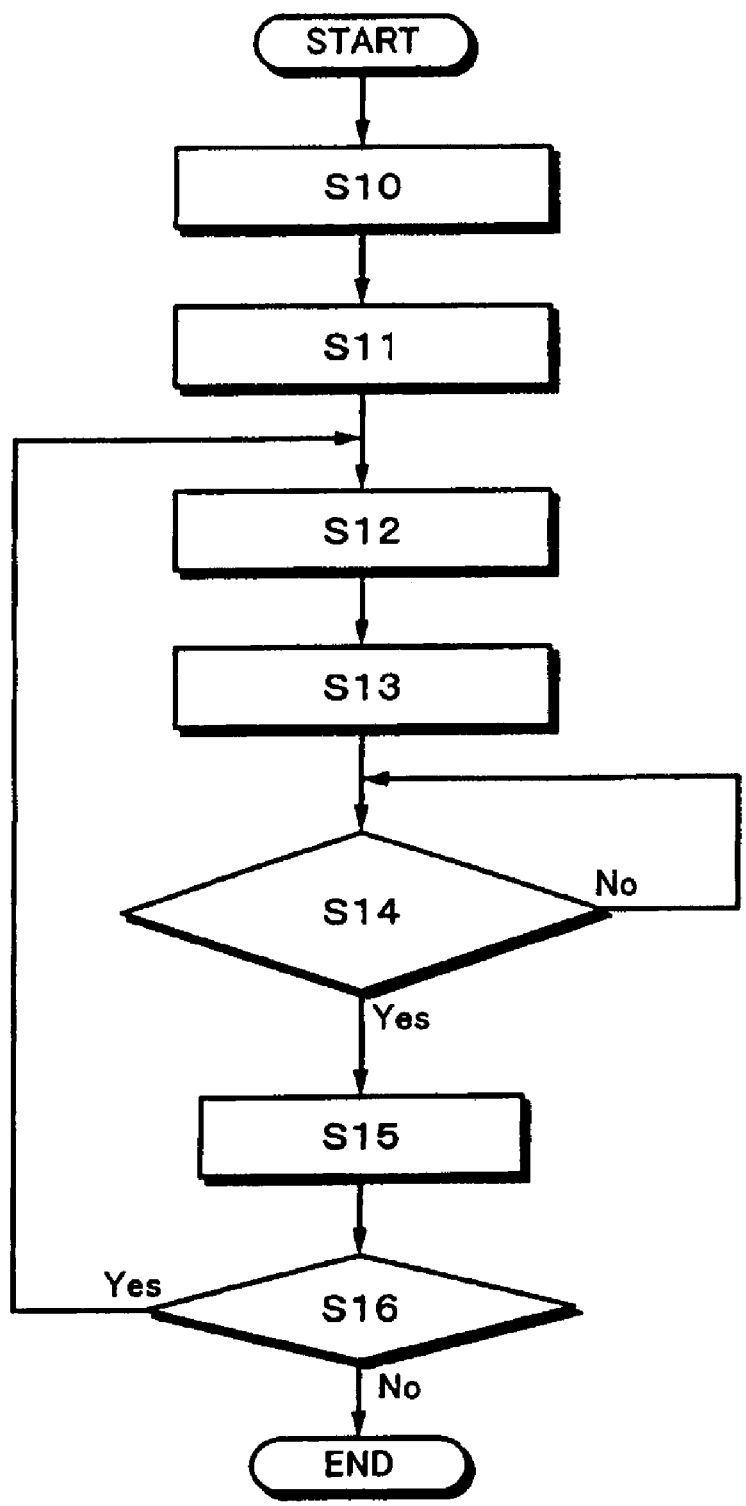
FIG. 4 is a flow chart describing an example of an information registration procedure on a registration screen.

Next, with reference to a flow chart shown in FIG. 4, an example of an information registration procedure on the registration screen 50 will be described. First of all, information registration music data are selected in the music selection portion 51 (at step S10). Information is displayed in the data display portion 54 (at step S11). In this example, it is assumed that files and/or folders are displayed as icons in the data display portion 54. An icon corresponding to information that the user wants to register is selected in the data display portion 54 with a pointing device for example the mouse 31 (at step S12). In the example shown in FIG. 3, an icon of file "UVWX-.txt" is highlighted, indicating that this file has been selected. After information to be registered has been selected, by clicking the button 53B, the information registration music data selected in the music selection portion 51 are played (at step S13). The information registration music data are reproduced as a sound for example by the speaker 19.

The user listens to the information registration music data with the speaker 19 and determines whether or not to register the selected information at the current music playing position (at step S14). When the user wants to register the selected information at the current music playing position, he or she clicks the OK button 55 (at step S15). When the OK button 55 is clicked, the selected information is correlated with the music playing position corresponding to the click position of the OK button 55 in the information registration music data on the basis of for example a registration table (which will be described later). As a result, the information is registered to the information registration music data. At this point, the information registration music data may be continuously played. Instead, after the information has been registered, playing of the information registration music data may be stopped.

When there is still information to be registered (at step S16), the flow returns to step S12. At this point, it is assumed that after information has been registered, playing of information registration music data is stopped.

The foregoing procedure is just an example. Thus, the present invention is not limited to such an example. For example, the order of steps S10 to S13 is not limited to such an example. For example, after information registration music data are selected at step S10, playing of the information registration music data may be started (at step S13). Thereafter, information may be displayed in the data display portion 54 (at step S11). Thereafter, information to be registered may be selected (at step S12). Instead, after information is displayed in the data display portion 54, playing of information registration music data may be started. Thereafter, information to be registered may be selected. It is not necessary to select information registration music data at the beginning, at step S10, of the procedure. Instead, it is sufficient to have selected information registration music data before playing is started.

A process of continuously registering a plurality of items of information is not limited to such an example. For example, in the flow chart shown in FIG. 4, after information is registered, when playing of information registration music data is continued and next information is registered, step S13 is omitted. When the determined result at step S16 is Yes, the flow may advance to step S11. At step S11, information displayed in the data display portion 54 may be changed. Instead, when the determined result at step S16 is Yes, the flow may return to step S10. At step S10, with another music data used as information registration music data, the process may be continued. In these cases, the order of step S10 to step S13 is not limited to the order shown in FIG. 4.

In the foregoing example, information selected by the data display portion 54 is registered to information registration music data. However, the present invention is not limited to such an example. For example, when information is registered, information may be newly created and registered to a music playing position of information registration music data. In this case, it can be thought that while information registration music data are being played, in the state that no information has been selected in the data display portion 54, by clicking the OK button 55, a file is newly created and registered to the information registration music data.

For example, while information registration music data are being played, in the state that no information has been selected in the data display portion 54, when the OK button 55 is clicked, a text input dialog box is displayed. Text data that are input to the dialog box are stored in a predetermined file. The file is correlated with and registered to a music playing position corresponding to the click position of the OK button 55 in the information registration music data. Instead, while information registration music data are being played, in the state that no information has been selected in the data display portion 54, when the OK button 55 is clicked, predetermined application software may be started up. Alternatively, when the OK button 55 is clicked, such application software may be designated.

In the foregoing example, by clicking a pointing device such as the mouse 31, information is registered to information registration music data. However, the present invention is not limited to such an example. For example, a predetermined key of the keyboard 30 may be assigned to a shortcut key for registering information. In this case, when the user is ready to press the shortcut key with his or her finger, he or she can register information while listening to information registration music data without necessity of watching the monitor 15.

In addition, information displayed in the data display portion 54 may be successively and automatically selected. In this case, a plurality of items of information can be more easily registered than the foregoing example.

Figure 5:
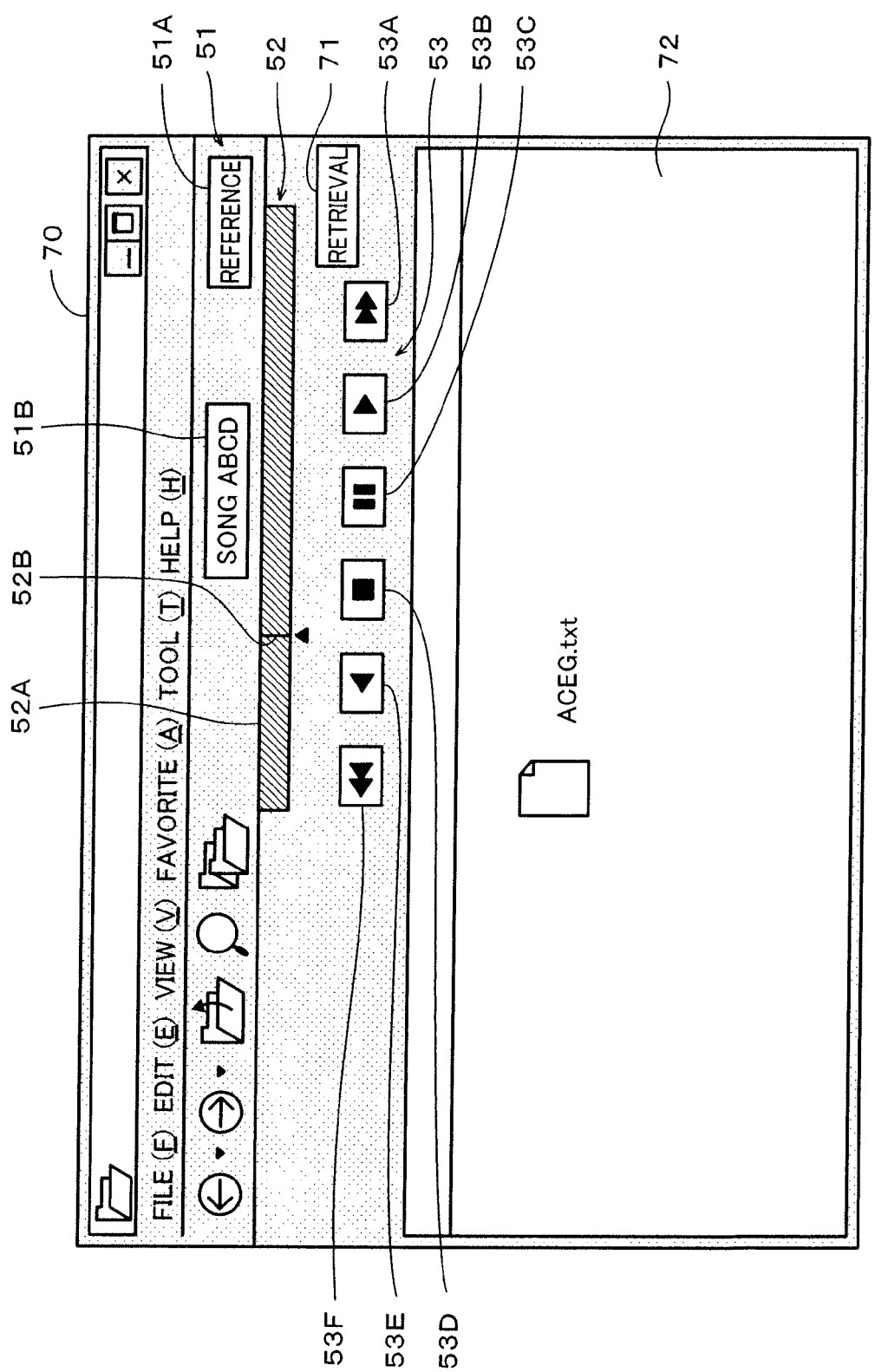
FIG. 5 is a schematic diagram showing an example of a user interface with which registered information is retrieved from information registration music data according to the first embodiment of the present invention.

FIG. 5 shows an example of a user interface with which information is retrieved from information registration music data according to the first embodiment of the present invention. For simplicity, in FIG. 5, similar portions to those in FIG. 3 will be denoted by similar reference numerals and their description will be omitted.

As exemplified in FIG. 5, a retrieval screen 70 is composed of a GUI that is partly the same as that of the registration screen 50. In other words, the retrieval screen 70 contains a music selection portion 51 with which information registration music data are designated, a music playing position display portion 52 that represents a playing position of information registration music data, and a music playing control portion 53 with which playing of information registration music data is controlled. Since meanings of button images and item images contained in the music selection portion 51, the music playing position display portion 52, and the music playing control portion 53 are nearly the same as those contained in the registration screen 50, their description will be omitted.

When a retrieval button 71 is clicked while information registration music data are being played, information registered at the music play position corresponding to the click position of the retrieval button 71 is retrieved. The retrieved result is displayed in a retrieved result display portion 72.

Figure 6:
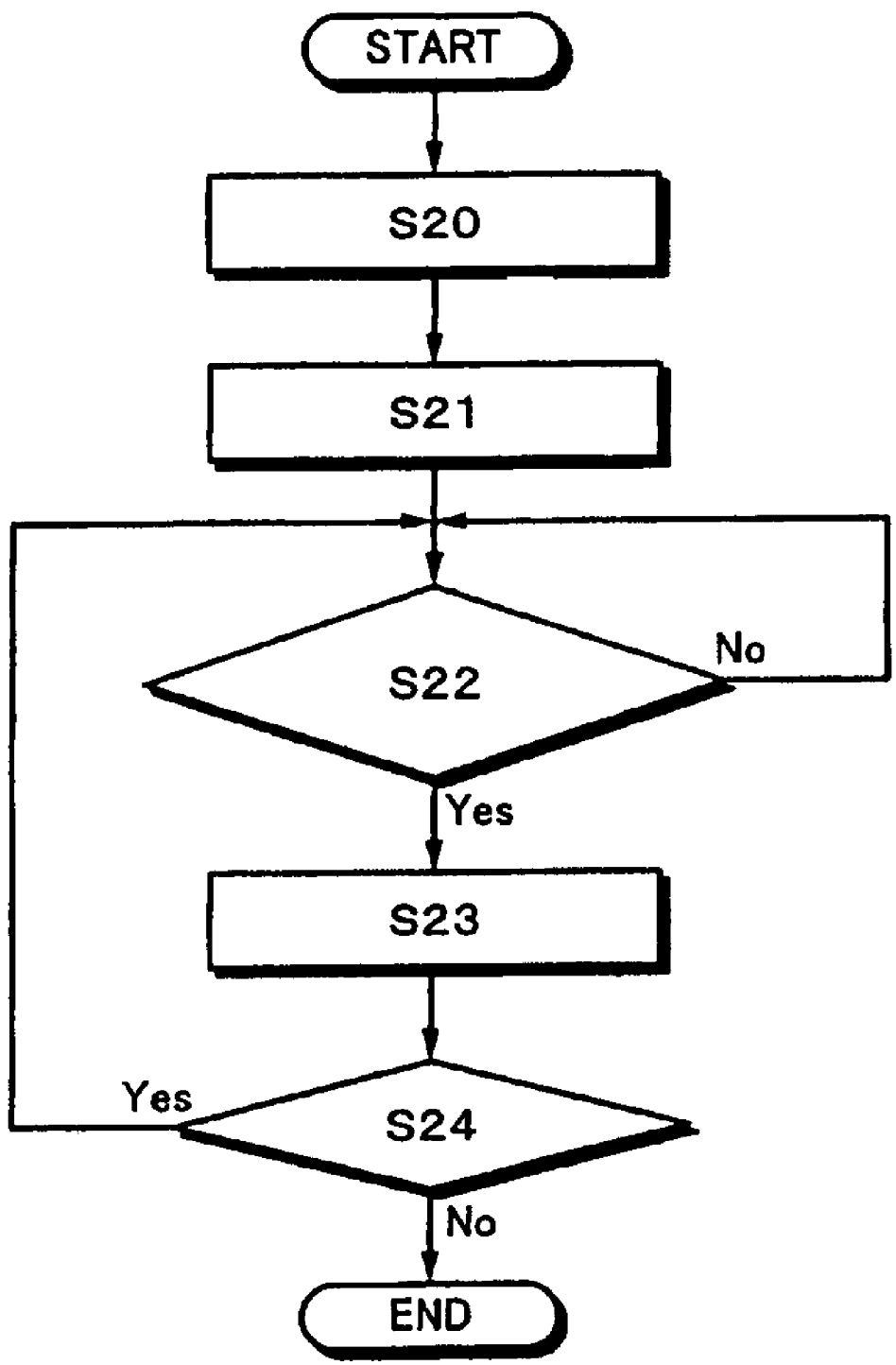
FIG. 6 is a flow chart describing an example of an information retrieval procedure on a retrieval screen.

Next, with reference to a flow chart shown in FIG. 6, an example of an information retrieval procedure on the retrieval screen 70 will be described. First of all, information registration music data used to retrieve information is selected in the song selection portion 51 (at step S20). At step S21, the button 53B is clicked. The information registration music data selected in the music selection portion 51 are played. The information registration music data are played as a sound for example by the speaker 19.

The user listens to the information registration music data and determines whether or not they have come to a music playing position where desired information had been registered (at step S22). When the information registration music data has come to the playing position where desired information had been registered (at step S22), he or she clicks the retrieval button 71 (at step S23). When the user clicks the retrieval button 71, information registered at the music playing position corresponding to the click position of the retrieval button 71 is retrieved for example from a registration table. When corresponding information is present in the registration table, the information is displayed in the retrieved result display portion 72. In the example shown in FIG. 5, as a retrieved result, file "ACEG.txt" has been obtained. In this example, after a retrieved result has been obtained, the information registration music data are continuously played. When information is further retrieved, the flow returns to step S22.

When file "ACEG.txt" obtained as the retrieved result is for example double-clicked, the file can be browsed. In this case, it is preferred that the file 73 have been read and application software associated with the file 73 be started. Instead, the file 73 may be able to be copied or moved to a proper folder by dragging and dropping the file 73.

Figure 7:
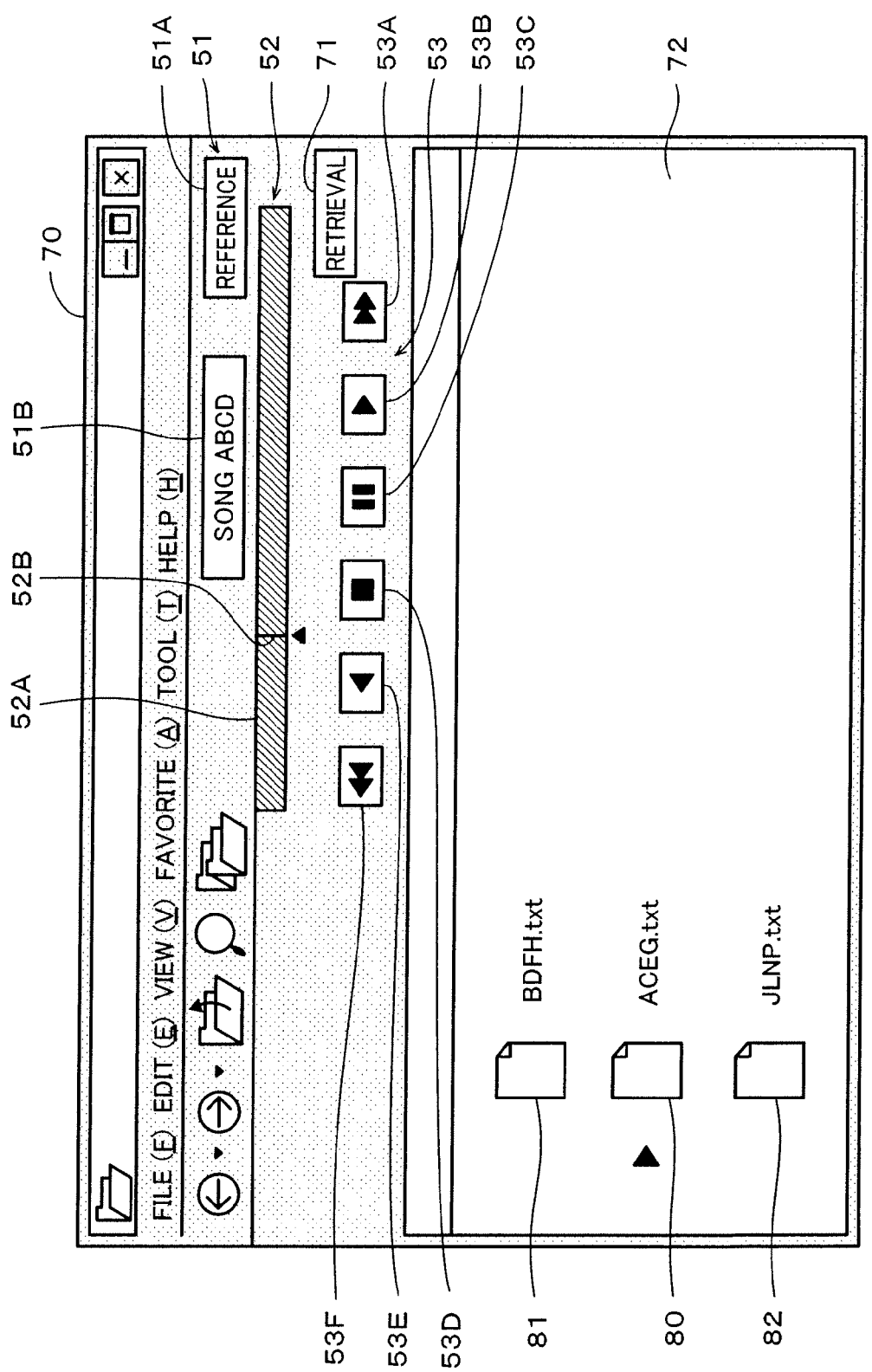
FIG. 7 is a schematic diagram describing that information registered at a music playing position corresponding to a clip position of a selection button and information registered adjacent to the music playing position are displayed as a retrieved result.

In the example shown in FIG. 5, one retrieved result is obtained corresponding to one music playing position. However, the present invention is not limited to such an example. Instead, as exemplified in FIG. 7, information 80 registered at the music playing position corresponding to the click position of the retrieval button 71 may be displayed in the retrieved result display portion 72. In addition, information 81 and 82 registered at the music playing positions before and after the playing position corresponding to the click position of the retrieval button 71 may be displayed. Thus, even if click timing of the retrieval button 71 deviates, desired information can be retrieved.

When information is retrieved, the playing speed of the information registration music data can be varied. When the fast-forward button 53A contained in the music playing control portion 53 is clicked, the playing speed can be increased. As a result, desired information can be more quickly retrieved than at normal speed. In addition, when a slow play button (not shown in FIG. 3 and FIG. 5) is contained in the music playing control portion 53, while the information registration music data are being slowly played, information may be registered or retrieved. When the playing speed is deceased, more information can be registered to the information registration music data on the registration screen 50 than at normal speed. In addition, information can be more accurately retrieved on the retrieval screen 70 than at normal speed. In addition, a jog dial may be connected as an input device to the input I/F 17. With the jog dial, when information is retrieved, the playing speed can be freely varied.

In addition, a control pad 32 having a vibration function may be connected to the input I/F 17. With this function, the control pad 32 can be vibrated at a music playing position where information has been registered in the information registration music data. Thus, when information is registered or retrieved, the control pad 32 can be vibrated while information registration music data are being reproduced.

In the foregoing example, by clicking a pointing device such as the mouse 31, information is retrieved from information registration music data. However, the present invention is not limited to such an example. For example, a predetermined key of the keyboard 30 may be assigned to a shortcut key for retrieving information. In this case, when the user is ready to press the shortcut key with his or her finger, he or she can restore information while listening to information registration music data without necessity of watching the monitor 15.

FIG. 8 shows an example of a registration table that correlates the foregoing information registration music data, their music playing positions, and information. In a registration table 60 exemplified in FIG. 8, information is correlated with music playing positions (times) from the beginning of the information registration music data represented by music file names. The registration table 60 is stored for example in the hard disk drive 20 of the computer device 1 in a predetermined manner.

In first line to fourth line of the table exemplified in FIG. 8, each item of information has been correlated with information registration music data (non-compressed audio data) having file name "ABCD.WAV". In the first line, for example, information as text file "C:¥DATA¥FILE.TXT" has been correlated with and registered to music playing position "1 minute, 21 seconds, 00" of the information registration music data. In the second line, for example, program file "C:¥Program Files¥PROG01.EXE" has been correlated with and registered to music playing position "1 minute, 26 seconds, 21" of the information registration music data. In the third line, for example, URL (Uniform Resource Locator) "http://www.jpo.go.jp/" has been correlated with and registered to music playing position "2 minutes, 01 second, 5" of the information registration music data. In the fourth line, for example, the OK button 55 has been clicked while the information registration music data have been played although no information had been selected in the data display portion 54. In this example, text file "C:¥memo¥0001.TXT" has been newly created, correlated with, and registered to music playing position "3 minutes, 5 seconds, 30" of the information registration music data.

In fifth line to seventh line, for example, different types of music data from those in the first line to fourth line have been used as information registration music data. In the fifth line, information registration music data are for example audio data that have been compression-encoded. In this example, information about a television broadcast (broadcasting channel, broadcasting time, and so forth) has been correlated with and registered to music playing position "0 minute, 20 seconds, 20" of audio data "1234.MP3" that have been compression-encoded according to the MP3 system. In the sixth line, information registration music data are present for example in an external computer device with which the computer device 1 can communicate through the communication I/F 16 and the network. The file name field of information registration music data describes a position of the information registration music data on the network (in the example shown in FIG. 7, URL). In the seventh line, information registration music data are for example MIDI data. In the seventh line, for example, moving picture data "C:¥MOVIE¥001.MOV" has been correlated with and registered to music playing position "00 minute, 30 seconds, 01" at normal speed of MIDI data having file name "EFG.MID".

It seems that there are various methods of correlating positions (addresses) of information registration music data with music playing positions as time information corresponding to types of information registration music data. When information registration music data are for example PCM audio data that have not been compressed, the positions of information registration music data are correlated with music playing positions based on sampling frequencies of the audio data and sampling numbers of the music playing positions. When information registration music data are for example audio data that have been compression-encoded in the unit of a block according to the MP3 system or the like, the positions of information registration music data are correlated with music playing positions based on block numbers of music playing positions, sample numbers of each of the blocks, and sampling frequencies of the audio data. When information registration music data are data composed of performance instruction information such as MIDI data, the positions of information registration music data are correlated with music playing positions based on time information of the data. Since techniques of correlating positions (addresses) of music data with music playing positions (time information) are well known, their detail description will be omitted.

In the foregoing example, information registration music data, their playing positions, and information are correlated on the basis of the registration table 60 and the information is registered to the information registration music data. However, the present invention is not limited to such an example. Instead, as information registration music data or attribute information thereof, music playing positions and information correlated therewith can be described. When the registration table 60 is used, it may be used as internal information of the OS.

It is preferred that when the reference button 51A is clicked in the music selection portion 51 of the retrieval screen 70, a list of music data names be displayed based on information registration music data registered in the registration table 60, because it is not necessary to look for information registration music data used to register information. In addition, it is preferred that when attribute information such as names other than information such as file names and song names that have been assigned to information registration music data can be assigned to the information registration music data on the registration screen 50, the user be able to easily know what information has been registered to the information registration music data. In this case, the music selection portion 51 of the retrieval screen 70 further contains a display portion for attribute information such as additionally assigned names. When the reference button 51A is clicked, the attribute information can be displayed along with a list of music data names. As a result, information registration music data to which desired information has been registered can be quickly retrieved.

In the foregoing example, information is directly registered to information registration music data. However, the present invention is not limited to such an example. Instead, for example, information can be hierarchically registered. In this case, it can be thought that second information registration music data are registered to music playing positions of first information registration music data and information is registered to music playing positions of the second information registration music data. When a plurality of different items of second information registration music data are registered to first information registration music data and information is registered to each item of the second information registration music data, information can be categorized and registered and information can be registered such that it can be coarsely or finely retrieved.

In the foregoing example, information is retrieved based on music playing positions of information registration music data. However, the present invention is not limited to such an example. Instead, both the regular information retrieval using images and text displayed on the monitor 15 and information retrieval according to the present invention can be jointly performed. When information is coarsely retrieved from large categories, with the keyboard 30 and the mouse 31, data displayed on the monitor 15 are selected. Thereafter, information is retrieved from retrieved categories based on music playing positions of information registration music data. In this case, when information is retrieved on the basis of information registration music data, music is quickly played with the jog dial or the fast-forward button 53A and an approximate position of desired information is retrieved. After the approximate position of the desired information has been retrieved, the exact position of the desired information can be decided with images displayed on the monitor 15.

In addition, music playing position information of music data and information of the music data may be added as tag information to predetermined information. It can be thought that the music data are further added to the information.

In addition, information registration music data to which information has been registered may be changed to another music data. At this point, music playing position information at which the information has been registered to information registration music data that have not been changed can be applied to information registration music data that have been changed. When information registration music data are properly changed, their secrecy can be improved.

Figure 9:
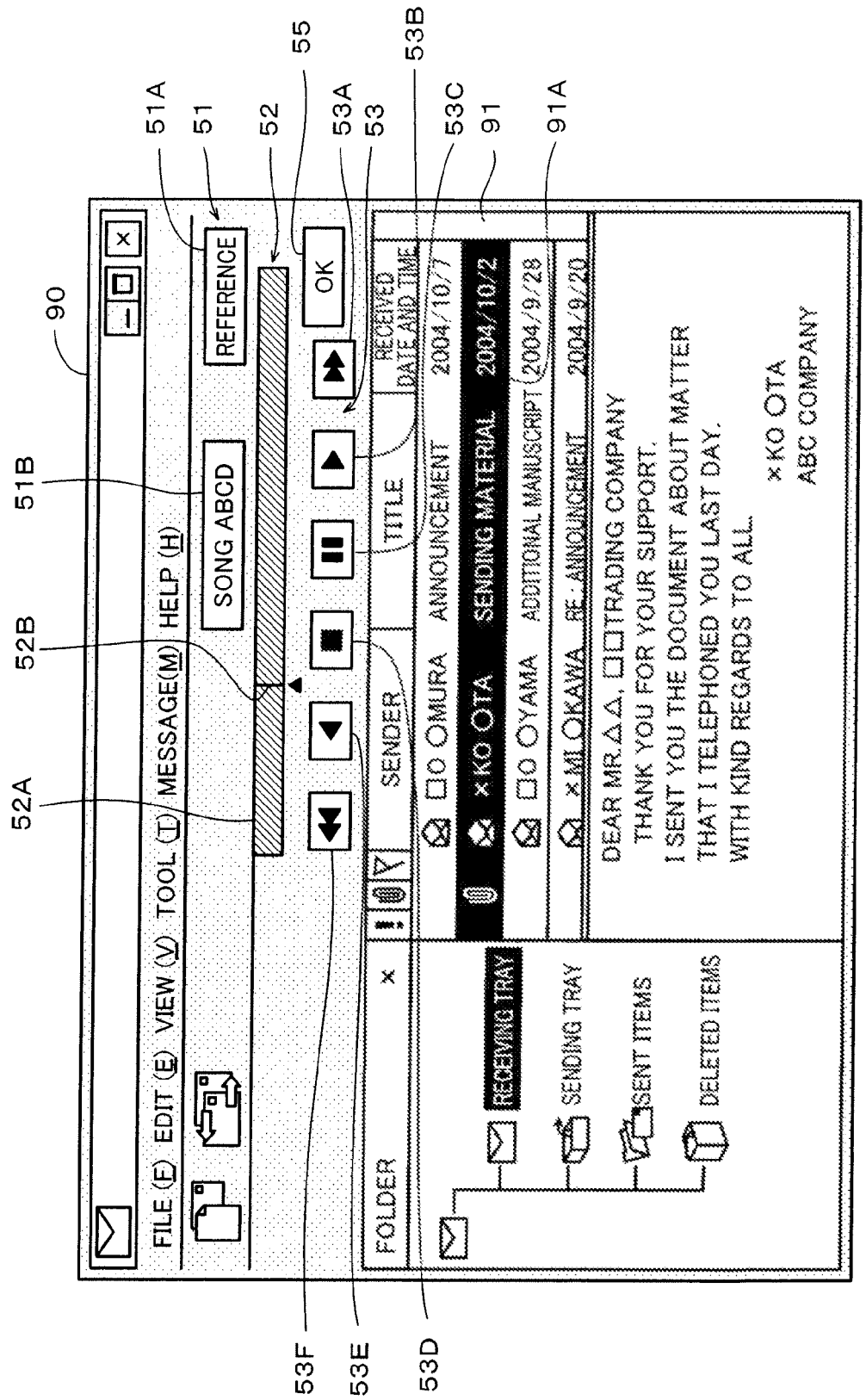
FIG. 9 is a schematic diagram describing an example of which the present invention is applied to a mailer.

As a modification of the present invention, as exemplified in FIG. 9, the information registration and retrieval methods according to the present invention can be applied to a mailer 90 that receives, sends, and manages electronic mail. In this case, the mailer 90 contains the foregoing music selection portion 51, music playing position display portion 52, and music playing control portion 53. The user can register an electronic mail message 91A selected from a mail list display portion 91 to a music playing position of information registration music data displayed in the display portion 51B in the foregoing manner. When the present invention is applied to the mailer 90, it can be thought that information registration music data used to register messages are different for each sender of electronic mail.

In this case, the foregoing hierarchical structure can be applied to the mailer 90 such that sender information of electronic mail messages is registered to first information registration music data, different items of second information registration music data are assigned to individual senders of electronic mail messages, and electronic mail messages from individual senders are registered to individual items that differ in individual senders of the second information registration music data.

As another modification of the present invention, a plurality of items of information may be randomly registered to music playing positions of information registration music data. It can be thought that what information has been registered at what music playing positions of information registration music data is guessed as a game. For example, a pair of items of information are registered to two music playing positions randomly designated in information registration music data. Thereafter, a music playing position at which information has been registered is retrieved. Next, a music playing position at which information paired with the information registered at the music playing position has been retrieved is retrieved. Thus, this modification can be enjoyed like card game "Concentration".

In the foregoing example, the registration screen 50 on which information is registered to information registration music data, the retrieval screen 70 on which information is retrieved from information registration music data, and so forth are structured with GUIs. However, the present invention is not limited to such an example. Instead, these interfaces may be structured with CUIs (Character-based User Interfaces).

In the foregoing example, the first embodiment of the present invention is applied to the computer device 1 such as a personal computer. However, the present invention is not limited to such an example. Instead, as long as much information can be stored, music data can be played, and input means that can be operated by the user is provided, the present invention can be applied to other information devices. For example, the present invention can be applied to a home game machine. In addition, the present invention can be applied to a portable telephone terminal that has a music data playing function and a user data storing function.

Next, a second embodiment of the present invention will be described. In the first embodiment, music data were used to register information. In contrast, in the second embodiment of the present invention, picture data are used as content data. Information is registered at reproduction positions of picture data. Picture data may be accompanied by audio data and/or music data. When picture data are used to register information, the information is registered at frame positions of the picture data. Information can be further registered at two-dimensional positions of frames.

As long as contents of picture data used to register information change in time series and they can be reproduced, any type of picture data can be used.

For example, picture data such as a movie or a drama recorded on a record medium can be used to register information. Instead, live-recoded picture data such as sports may be used to register information. Instead, picture data that are reproduced corresponding to a program such as a picture represented by CG (Computer Graphics) may be used to register information. When picture data such as a music clip picture of which music has the same weight as picture are used to register information, an effect of which information is registered with the foregoing music data can be additionally obtained. Instead, picture data such as a slideshow that successively changes still pictures at a predetermined interval can be used to register information. When a slideshow is used, positions at which information is registered correspond to display timings of still pictures.

Figure 10:
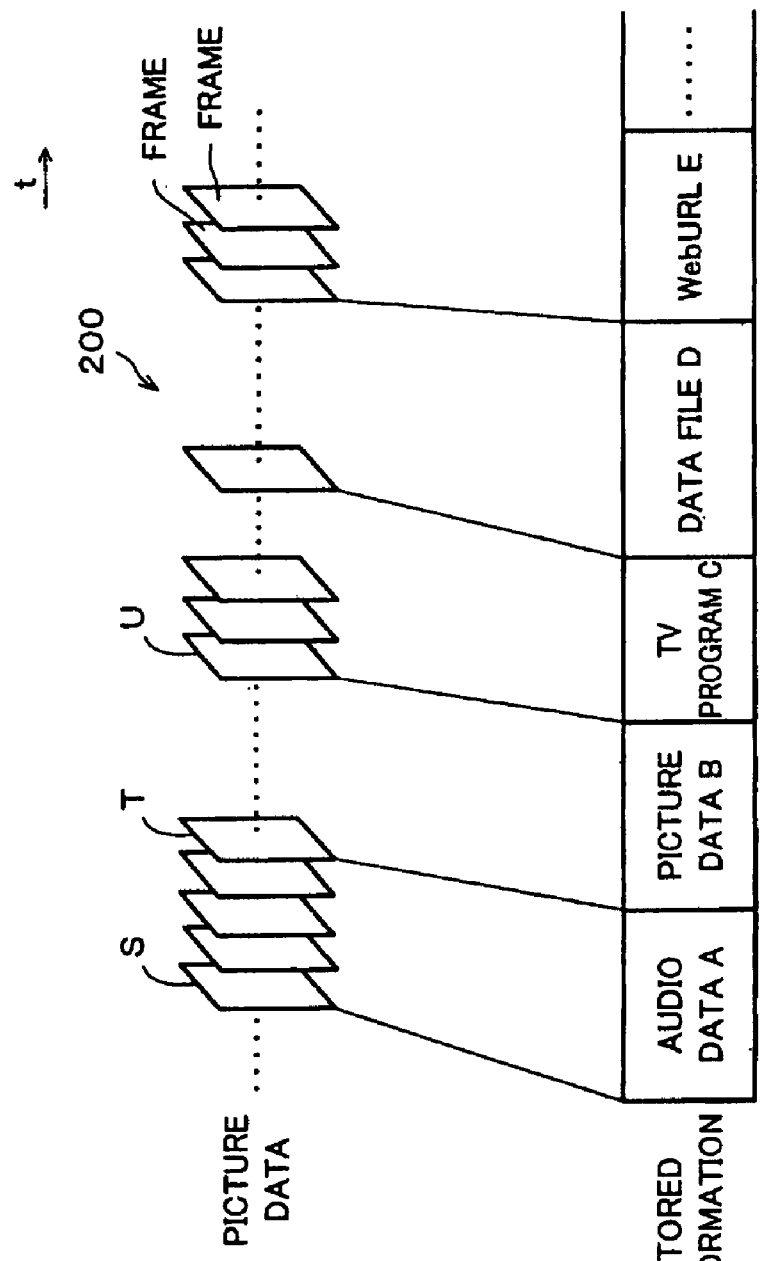
FIG. 10A and FIG. 10B are schematic diagrams conceptually describing an information management method according to a second embodiment of the present invention.

Next, with reference to FIG. 10A and FIG. 10B, an information management method according to the second embodiment of the present invention will be conceptually described. FIG. 10A shows an example of which picture data 200 reproduced for example by a computer device are represented as frames. The user operates the computer device to reproduce the picture data 200. Thereafter, the user selects registered information. While watching the reproduced picture data 200 on a monitor, the user operates input means such as a keyboard at a scene where he or she wants to register information in a predetermined manner. The computer device correlates information that the user has selected with a frame corresponding to the operation of the input means in the picture data 200 and registers the information to the picture data 200. The registered position of the information is represented by time code (h hours, m minutes, s seconds, f frames) generally used to manage time of the picture data 200. Instead, the registered position may be represented by a frame number counted from the beginning of the picture data 200.

In the example shown in FIG. 10A and FIG. 10B, audio data A are correlated with frame S of the picture data 200. Picture data B are correlated with frame T of the picture data 200. Television program C is correlated with frame U of the picture data 200. Although details will be omitted, like the first embodiment, various types of information can be correlated with the picture data 200.

When picture data are accompanied by music data, it can be thought that information is registered based on music like the first embodiment. In the second embodiment, in this case, information is registered at a frame position corresponding to a music playing position of music data. Instead, information may be correlated with a music playing position of music data.

An information retrieval method of the second embodiment is conceptually the same as that of the first embodiment except that music data are substituted into picture data. In other words, when for example picture data B are retrieved, the user operates the computer device to reproduce the picture data 200. The user watches the reproduced picture on a monitor and operates predetermined input means such as a keyboard at a scene where picture data B were registered. Corresponding to the operation, picture data B correlated with frame T are accessed.

Like the first embodiment, information can be intuitionally retrieved based on a picture.

When information is retrieved based on picture data, since the user may not be able to accurately designate a frame where he or she registered the information, it is preferred that the information be able to be retrieved in a predetermined range of frames adjacent to the registered frame position. Like the foregoing example, it can be thought that a retrieval range of first information is from a frame position where first information was registered to a second registration music playing position next to the first information of the same picture. Instead, a retrievable range can be designated from a frame position where information was registered for a predetermined number of frames. Instead, a retrieval range may be designated in a predetermined range of frames adjacent to a frame position where information was registered.

Figure 11:
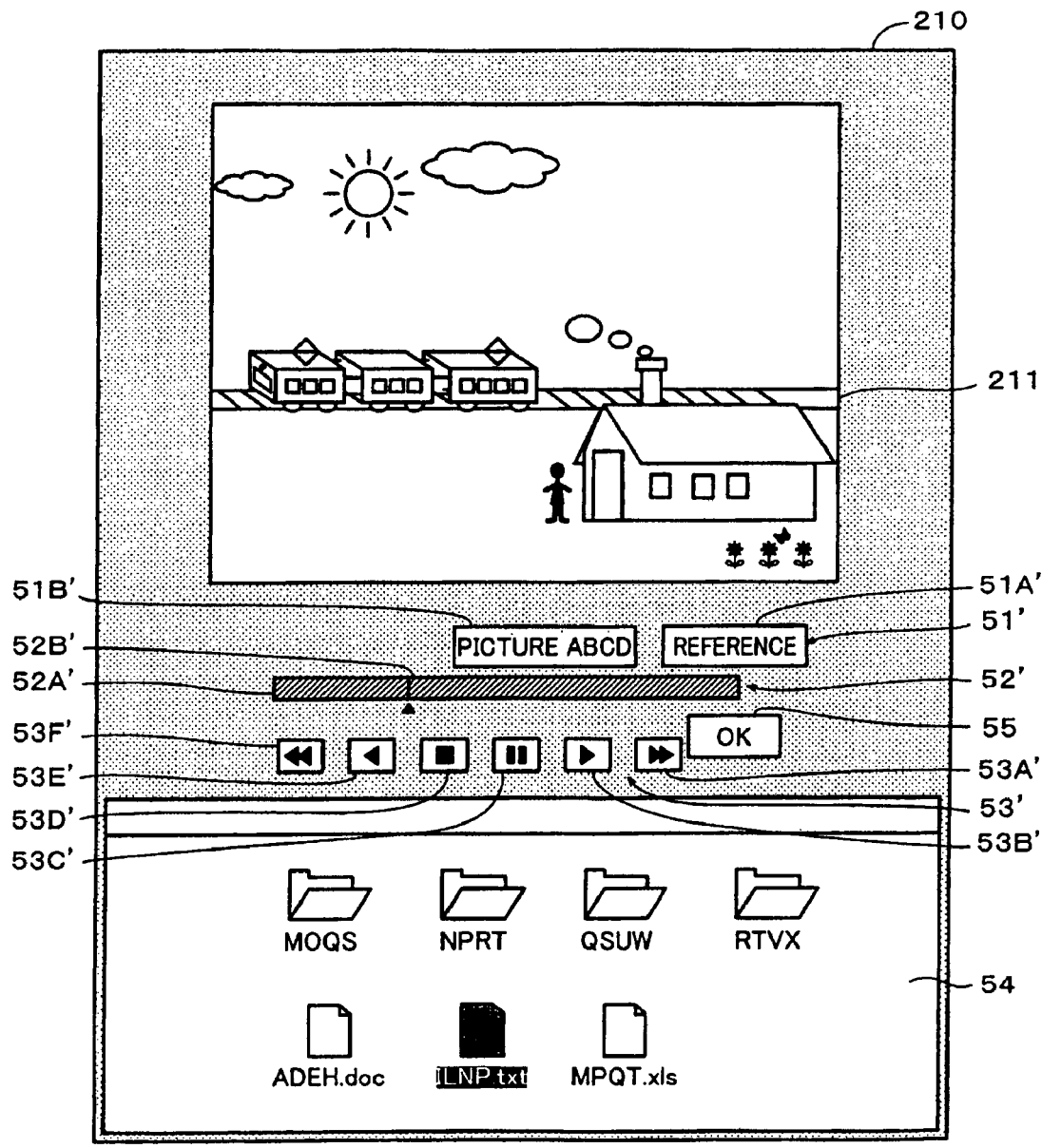
FIG. 11 is a schematic diagram showing an example of a user interface with which information is registered according to the second embodiment of the present invention.

FIG. 11 shows an example of a user interface with which information is registered according to the second embodiment of the present invention. Since the computer device 1 described with reference to FIG. 2 can be applied to the second embodiment of the present invention, detail description of the hardware structure will be omitted. In FIG. 11, similar portions to those in FIG. 3 will be denoted by similar reference numerals and their description will be omitted.

In the second embodiment, as a user interface with which information is registered, as exemplified in FIG. 11, a registration screen 210 of which a picture display portion 211 is added to the registration screen 50 shown in FIG. 3 can be used. The registration screen 210 contains a picture selection portion 51', a picture reproduction position display portion 52', a reproduction control portion 53', a data display portion 54, and an OK button 55.

The picture selection portion 51' is a portion with which picture data used to register information are selected. When a reference button 51A' is clicked, a list of picture data is displayed. When picture data used to register information are selected from the list of picture data, a file name of the selected picture data is displayed in a display portion 51B. In addition, attribute information of the selected picture data can be additionally displayed in the selection portion 51'. Hereinafter, picture data used to register the information are referred to as information registration picture data.

The information registration picture data is not limited to a particular format as long as they can be reproduced by the computer device 1 and their reproduction positions can be identified. For example, picture data that have been compression-encoded according to MPEG2 (Moving Pictures Experts Group 2) or MPEG1 can be used as information registration picture data. Of course, picture data that can be used mainly for personal computers, for example QuickTime® files and AVI (Audio-Video Interleaved) files can be used.

The reproduction position display portion 52' displays the full length of picture data displayed in the display portion 51B of the picture selection portion 51' in a display portion 52A'. A position line 52B represents a current reproduction position. When the position line 52B is dragged, the reproduction position can be changed.

The reproduction control portion 53' contains buttons 53A' to 53G' with which reproduction of picture data displayed in the display portion 51' is controlled. The button 53A' is a fast-forward button with which picture data are reproduced at high speed. The button 53B' is a reproduction button with which picture data are reproduced at normal speed in forward direction. The button 54C' is a stop button with which reproduction of picture data is stopped and the reproduction position is returned to the beginning of the picture data. The button 54D' is a pause button with which reproduction of picture data is temporarily stopped without moving the reproduction position. After the pause button 54D' is clicked, when the pause button 54D' is clicked again or the reproduction button 53B' is clicked, reproduction is resumed from the temporarily stopped reproduction position. The button 54E' is a reverse reproduction button with which picture data are reproduced at normal speed in reverse direction. The button 54F' is a fast-reverse button with which picture data are reproduced at high speed in reverse direction. It is preferred that a forward slow reproduction button, a reverse slow reproduction button, and a frame reproduction button (not shown) be provided.

In addition, a control with which picture data are reproduced at any speed may be provided. When a jog dial is connected to the input I/F 17 and the reproduction speed is designated as a rotation angle of the jog dial, reproduction speed of picture data can be varied. With the jog dial, the reproduction speed can be easily varied.

Information displayed in the data display portion 54' can be registered to the information registration picture data displayed in the display portion 51B' of the picture selection portion 51'. Since information displayed in the data display portion 54 is the same as that shown in FIG. 3, its detail description will be omitted.

The OK button 55 is a button with which information is correlated with a music playing position of information registration picture data and information is registered to picture data. When the OK button 55 is clicked while information registration picture data are being played, information registration picture data, reproduction position information corresponding to a click position of the OK button 55, and selected information are correlated based on a registration table. The registration table is a table based on which information registration picture data, reproduction positions (frames) of information registration picture data, and information are correlated each other.

An information registration procedure on the registration screen 210 is nearly the same as that of the first embodiment described with reference to FIG. 4. For example, the user selects information registration picture data in the picture selection portion 51'. In addition, the user performs for example the drag and drop operations for a file or a folder in the data display portion 54, causes the data display portion 54 to display information, and selects information that he or she wants to register. In the example shown in FIG. 11, file "ILNP.txt" has been selected. When the user clicks the button 53B', information registration picture data selected in the picture selection portion 51' are reproduced. The picture of the reproduced picture data is displayed for example in the picture display portion 211.

While the user is watching the picture displayed in the picture display portion 211, he or she clicks the OK button 55 at a reproduction position where he or she wants to register the selected information. When the user clicks the OK button 55, the selected information is correlated with the reproduction position (frame) corresponding to the click position of the OK button 55 in the information registration picture data on the basis of the registration table. As a result, the information is registered to the information registration picture data. Instead, information may be registered by clicking for example the picture display portion 211 instead of the OK button 55.

Figure 12:
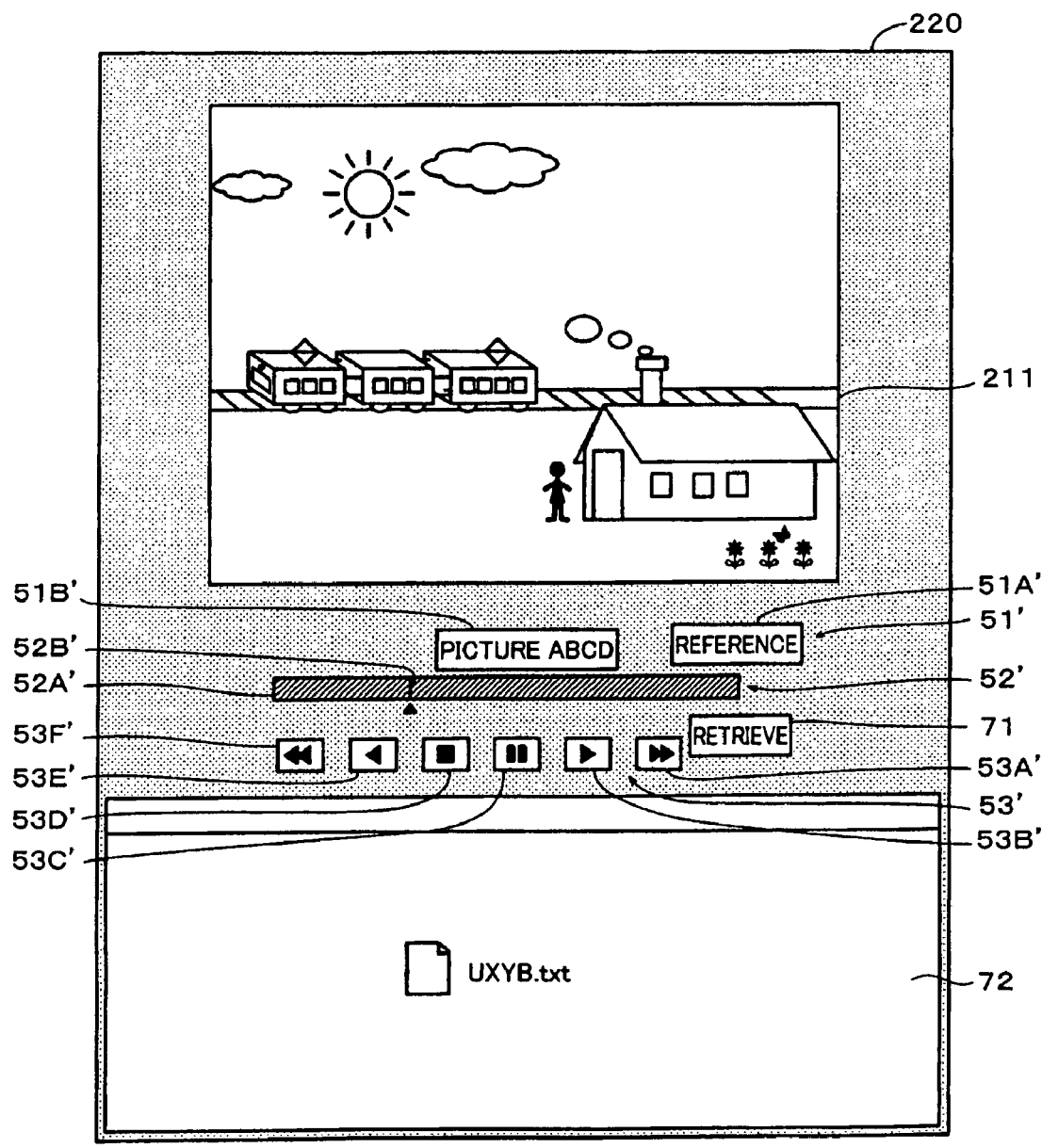
FIG. 12 is a schematic diagram showing an example of a user interface with which information is retrieved according to the second embodiment of the present invention.

FIG. 12 shows an example of a user interface with which information is retrieved from information registration picture data according to the second embodiment of the present invention. In FIG. 12, similar portions to those in FIG. 5 and FIG. 11 will be denoted by similar reference numerals and their description will be omitted.

As exemplified in FIG. 12, a retrieval screen 220 is composed of a GUI that is partly the same as that of the foregoing registration screen 210. In other words, the retrieval screen 220 contains a picture selection portion 51' with which information registration picture data are designated, a picture reproduction position display portion 52 that displays a reproduction position of information registration picture data, and a reproduction control portion 53' with which reproduction of information registration picture data is controlled. Since meanings of button images and item images of the picture selection portion 51', the reproduction position display portion 52', and the reproduction control portion 53' are the same as those of the registration screen 210, their detail description will be omitted.

When a retrieval button 71 is clicked while information registration picture data are being reproduced, information registered at the reproduction position (frame) corresponding to the click position from the information registration picture data. A retrieved result is displayed in a retrieved result display portion 72.

An information retrieval procedure on the retrieval screen 220 is nearly the same as that of the first embodiment described with reference to FIG. 6. In other words, the user selects information registration picture data used to retrieve information in the picture selection portion 51'. By clicking a button 53B', the selected information registration picture data are reproduced. The reproduced information registration picture data are displayed in the picture display portion 211.

While the user is watching the picture displayed in the picture display portion 211, he or she clicks the retrieve button 71 at a reproduction position where desired information has been registered. When the retrieval button 71 is clicked, information registered at the reproduction position (frame) corresponding to the click position in the information registration picture data is retrieved on the basis of registration table. As the retrieved result, when corresponding information is present in the registration table, it is displayed in the retrieved result display portion 72. In the example shown in FIG. 12, file "UXYB.txt" has been obtained as the retrieved result. Information may be retrieved for example by clicking the picture display portion 211 instead of the retrieval button 71.

When information is retrieved, the reproduction speed of the information registration picture data can be varied. When information registration picture data are reproduced at high speed by clicking the button 53A' in the reproduction control portion 53', desired information can be more quickly retrieved than at normal speed. When the reproduction control portion 53' contains a slow reproduction button and a frame reproduction button (not shown in FIG. 11 and FIG. 12), information can be registered or retrieved while information registration picture data are being slowly reproduced. When the reproduction speed is decreased, more information can be registered to the information registration picture data in the registration screen 210 than at normal speed. In addition, information can be more accurately retrieved on the retrieval screen 220 than at normal speed. In addition, a jog dial is connected as an input device to the input I/F 17. With the jog dial, when information is retrieved, the reproduction speed of the information registration picture data can be varied.

In addition, a control pad 32 having a vibration function may be connected to the input I/F 17. With the vibration function, the control pad 32 can be vibrated at a reproduction position where information has been registered in the information registration picture data. When information is registered or retrieved, the control pad 32 may be vibrated corresponding to information registration picture data that are reproduced or music data that are played corresponding to information registration picture data.

In the foregoing example, by clicking a pointing device such as the mouse 31, information is retrieved from information registration picture data. However, the present invention is not limited to such an example. For example, a predetermined key of the keyboard 30 may be assigned to a shortcut key for retrieving information. In this case, when the user is ready to press the shortcut key with his or her finger, he or she can more easily retrieve information without missing a relevant scene than the foregoing example.

Various examples of extensions described in the first embodiment, for example information registration picture data, reproduction positions as attribute information of information registration picture data, description of information correlated with reproduction positions, registration of hierarchical information of information registration picture data, combination with regular text retrieval, addition of reproduction position information of predetermined information registration picture data and information about the information registration picture data, and so forth may be applied to the second embodiment.

In the foregoing example, the second embodiment was applied to the computer device 1 such as a personal computer. However, the present invention is not limited to such an example. In other words, the present invention can be applied to another information device as long as it stores lot of information, reproduces picture data, and has input means that the user can operate. For example, the present invention can be applied to a family game machine. In addition, the present invention can be also applied to a potable telephone terminal having a picture data reproducing function and a user data storing function.

DESCRIPTION OF REFERENCE NUMERALS

1 COMPUTER DEVICE
17 INPUT INTERFACE
30 KEYBOARD
31 MOUSE
32 CONTROL PAD
50 REGISTRATION SCREEN
51 MUSIC SELECTION PORTION
52 MUSIC PLAYING POSITION DISPLAY PORTION
53 MUSIC PLAYING CONTROL PORTION
54 DATA DISPLAY PORTION
55 OK BUTTON
60 REGISTRATION TABLE

70 RETRIEVAL SCREEN
71 RETRIEVAL BUTTON
72 RETRIEVED RESULT DISPLAY PORTION
S10 SELECT INFORMATION REGISTRATION MUSIC DATA.
S11 DISPLAY INFORMATION IN DISPLAY PORTION.
S12 SELECT INFORMATION TO BE REGISTERED.
S13 START PLAYING.
S14 REGISTER SELECTED INFORMATION AT CURRENT MUSIC PLAYING POSITION ?
S15 CLICK OK BUTTON.
S16 NEXT INFORMATION ?
S20 SELECT INFORMATION REGISTRATION MUSIC DATA.
S21 START PLAYING.
S22 PLAYING POSITION AT WHICH DESIRED INFORMATION HAS BEEN REGISTERED ?
S23 SELECTION BUTTON
S24 NEXT INFORMATION ?

The invention claimed is:

1. A file storage apparatus providing an information management method, the information management method comprising:
 correlating one or more electronic files with audible cues included in a melody reproduced via the file storage apparatus;
 designating respective time intervals of the melody during which each of the one or more electronic files can be accessed by the file storage apparatus; and
 retrieving the one or more electronic files of the file storage apparatus upon a predetermined user input provided to the file storage apparatus based on one of the audible cues included in the melody during one of the respective time intervals of the melody.

2. The file storage apparatus as set forth in claim 1, wherein the one or more electronic files and the audible cues are correlated by respective user registration instructions provided to the file storage apparatus and issued while the melody is reproduced, the audible cues being associated with the one or more electronic files based on a timing of one of the respective user registration instructions issued while the melody is being reproduced.

3. A file storage apparatus providing an information management method, the information management method comprising:
 correlating one or more electronic files with visible cues relative to a slideshow reproduced via the file storage apparatus, wherein the slideshow successively changes at a same predetermined interval;
 designating respective time intervals of the slideshow during which each of the one or more electronic files can be accessed by the file storage apparatus; and
 retrieving the one or more electronic files of the file storage apparatus upon a predetermined user input provided to the file storage apparatus during one of the respective time intervals of the slideshow.

4. The file storage apparatus as set forth in claim 3, wherein the one or more electronic files and the visible cues are correlated by respective user registration instructions provided to the file storage apparatus and issued while the slideshow is reproduced, the visible cues being associated with the one or more electronic files based on a timing of one of the respective user registration instructions issued while the slideshow is being reproduced.

5. A computer readable non-transitory storage medium encoded with computer program instructions which when executed by a computer cause the computer to implement a method of file storage, the method comprising:
 correlating one or more electronic files with audible cues included in a melody reproduced via the computer;
 designating respective time intervals of the melody during which each of the one or more electronic files can be accessed by the computer; and
 retrieving the one or more electronic files of the computer upon a predetermined user input provided to the computer based on one of the audible cues included in the melody during one of the respective time intervals of the melody.

6. The computer readable non-transitory storage medium as set forth in claim 5, wherein one of the one or more electronic files is a text file, a program file, or a Uniform Resource Locator.

7. A computer readable non-transitory storage medium encoded with computer program instructions which when executed by a computer cause the computer to implement a method of file storage, the method comprising:
 correlating one or more electronic files with visible cues relative to a slideshow reproduced via the computer, wherein the slideshow successively changes at a same predetermined interval;
 designating respective time intervals of the slideshow during which each of the one or more electronic files can be accessed by the computer; and
 retrieving the one or more electronic files of the computer upon a predetermined user input provided to the computer during one of the respective time intervals of the slideshow.

* * * * *